(12) United States Patent
Farah et al.

(10) Patent No.: US 10,947,865 B2
(45) Date of Patent: Mar. 16, 2021

(54) TIE ROD FOR A MID-TURBINE FRAME

(71) Applicant: United Technologies Corporation, Farmington, CT (US)

(72) Inventors: Jorge I. Farah, Hartford, CT (US); Steven D. Porter, Wethersfield, CT (US); Paul K. Sanchez, Wellington, FL (US); Joseph J. Sedor, Oxford, MA (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 106 days.

(21) Appl. No.: 16/453,358

(22) Filed: Jun. 26, 2019

(65) Prior Publication Data

US 2020/0208538 A1 Jul. 2, 2020

Related U.S. Application Data

(62) Division of application No. 14/598,574, filed on Jan. 16, 2015, now Pat. No. 10,371,010.

(51) Int. Cl.
*F01D 25/28* (2006.01)
*F01D 9/06* (2006.01)
*F01D 25/16* (2006.01)
*F02C 7/20* (2006.01)

(52) U.S. Cl.
CPC ............. *F01D 25/28* (2013.01); *F01D 9/065* (2013.01); *F01D 25/162* (2013.01); *F02C 7/20* (2013.01); *F05D 2220/32* (2013.01); *F05D 2230/60* (2013.01); *F05D 2260/31* (2013.01)

(58) Field of Classification Search
CPC ........ F01D 25/28; F01D 25/162; F01D 9/065; F02C 7/20; F05D 2220/32; F05D 2230/60; F05D 2260/31
See application file for complete search history.

(56) References Cited

U.S. PATENT DOCUMENTS

| | | |
|---|---|---|
| 7,195,447 B2 | 3/2007 | Moniz et al. |
| 8,061,969 B2 | 11/2011 | Durocher et al. |
| 8,091,371 B2 | 1/2012 | Durocher et al. |
| 8,347,500 B2 | 1/2013 | Durocher et al. |
| 9,458,721 B2 | 10/2016 | Palmer |
| 2006/0093465 A1 | 5/2006 | Moniz et al. |
| 2008/0134687 A1 | 6/2008 | Kumar et al. |
| 2010/0135770 A1 | 6/2010 | Durocher et al. |
| 2011/0079019 A1 | 4/2011 | Durocher et al. |
| 2011/0081237 A1 | 4/2011 | Durocher et al. |
| 2013/0074518 A1 | 3/2013 | Palmer |
| 2013/0094951 A1 | 4/2013 | McCaffrey |

(Continued)

FOREIGN PATENT DOCUMENTS

| | | |
|---|---|---|
| EP | 2192274 | 6/2010 |
| EP | 2574737 | 4/2013 |

OTHER PUBLICATIONS

The Extended European Search Report for EP Application No. 16151125.8, dated May 18, 2016.

*Primary Examiner* — Moshe Wilensky
(74) *Attorney, Agent, or Firm* — Carlson, Gaskey & Olds, P.C.

(57) ABSTRACT

A method of assembling a mid-turbine frame includes engaging at least two tabs in a radially inner end of at least one spoke in a groove in an inner frame case. The at least one spoke is secured to the inner frame case with a central bolt extending through the inner frame case into the at least one spoke.

17 Claims, 3 Drawing Sheets

(56) References Cited

U.S. PATENT DOCUMENTS

2014/0000284 A1    1/2014   Scott
2014/0013770 A1    1/2014   Farah et al.
2014/0102110 A1    4/2014   Farah et al.
2014/0227078 A1    8/2014   Chokshi

TIE ROD FOR A MID-TURBINE FRAME

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a mid-turbine frame for a gas turbine engine includes an inner frame case that includes a bolt opening and at least one spoke for connecting an outer frame case to the inner frame case that includes an inlet passage that extends in a radial direction. A central bolt extends through the bolt opening for securing at least one spoke to the inner frame case.

In a further embodiment of the above, the central bolt includes an airflow passage that extends radially through the central bolt aligned with the inlet passage.

In a further embodiment of any of the above, the central bolt includes external threads that engage internal threads on at least one spoke.

In a further embodiment of any of the above, the internal threads on at least one spoke are located radially outward from the inner frame case.

In a further embodiment of any of the above, a head of the central bolt engages a radially inner surface of the inner frame case.

In a further embodiment of any of the above, a radially inner end of at least one spoke includes at least two tabs.

In a further embodiment of any of the above, the inner frame case includes at least two protrusions that form a groove for accepting at least two tabs.

In a further embodiment of any of the above, at least two protrusions are located on opposite sides of the bolt opening.

In a further embodiment of any of the above, the central bolt is located adjacent a surface of the inner frame case defining the bolt opening.

In another exemplary embodiment, a gas turbine engine includes a mid-turbine frame located axially between a first turbine and a second turbine. The mid-turbine frame includes an inner frame case which includes a bolt opening. At least one spoke for connecting an outer frame case to the inner frame case includes an inlet passage that extends in a radial direction. A central bolt extends through the bolt opening for securing at least one spoke to the inner frame case.

In a further embodiment of any of the above, the central bolt includes an airflow passage that extends radially through the central bolt and is aligned with the inlet passage.

In a further embodiment of any of the above, the central bolt includes external threads that engage internal threads on at least one spoke. The internal threads on at least one spoke are located radially outward from the inner frame case.

In a further embodiment of any of the above, a radially inner end of at least one spoke includes at least two tabs.

In a further embodiment of any of the above, the inner frame case includes at least two protrusions that form a groove for accepting at least two tabs.

In a further embodiment of any of the above, at least two protrusions are located on opposite sides of the bolt opening.

In another exemplary embodiment, a method of assembling a mid-turbine frame includes engaging at least two tabs in a radially inner end of at least one spoke in a groove in an inner frame case. At least one spoke is secured to the inner frame case with a central bolt that extends through the inner frame case into at least one spoke.

In a further embodiment of any of the above, the method includes aligning an inlet passage in at least one spoke with an airflow passage in the central bolt.

In a further embodiment of any of the above, the groove is formed by at least two protrusions located on opposite sides of a bolt opening in the inner frame case.

In a further embodiment of any of the above, the central bolt includes external threads that engage internal threads on at least one spoke. The internal threads on at least one spoke are located radially outward from the inner frame case.

In a further embodiment of any of the above, at least two tabs are spaced from the inner frame case to ensure that at least two protrusions engage the radially inner end of at least one spoke.

DETAILED DESCRIPTION

Figure 1:
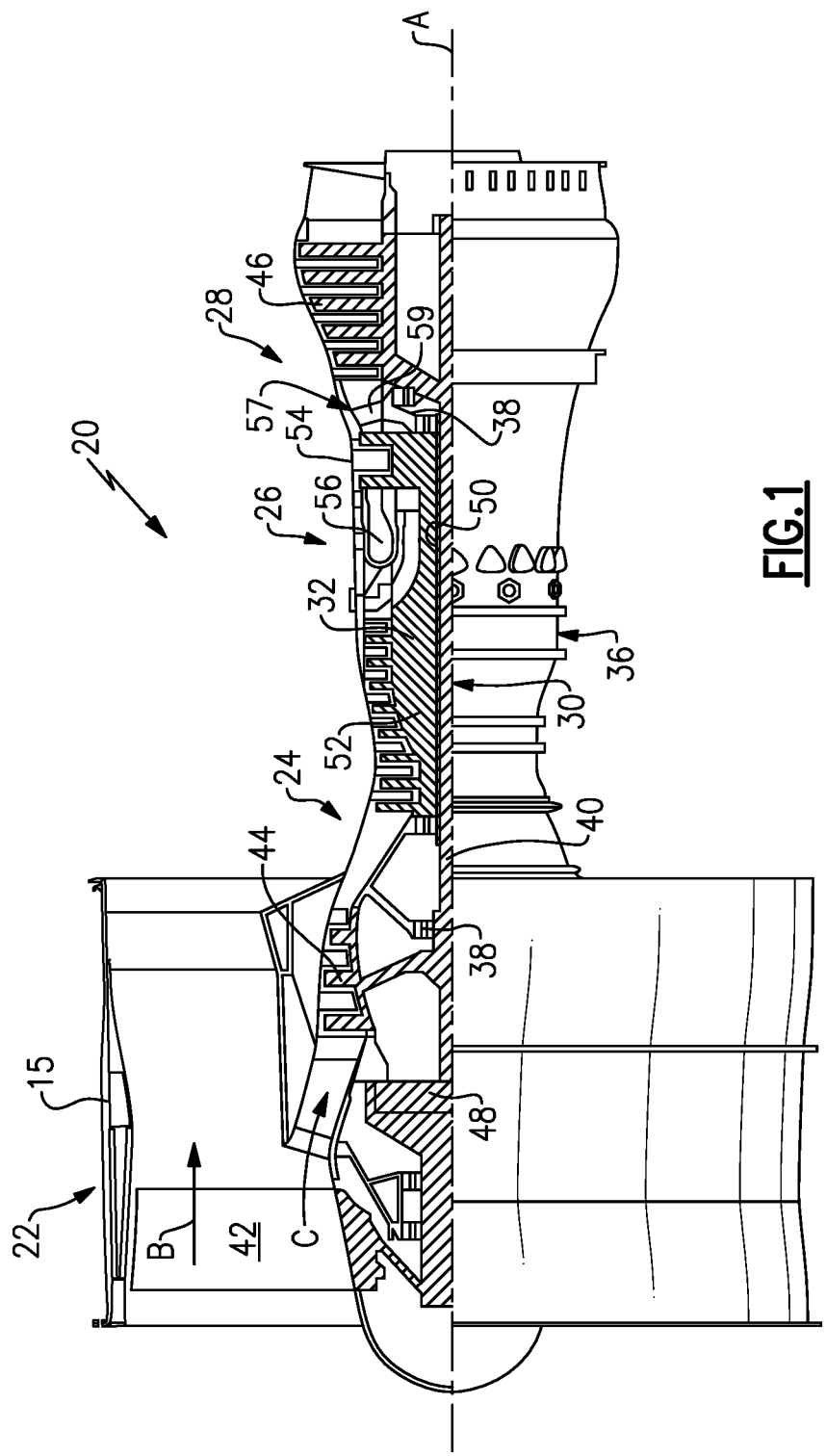
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
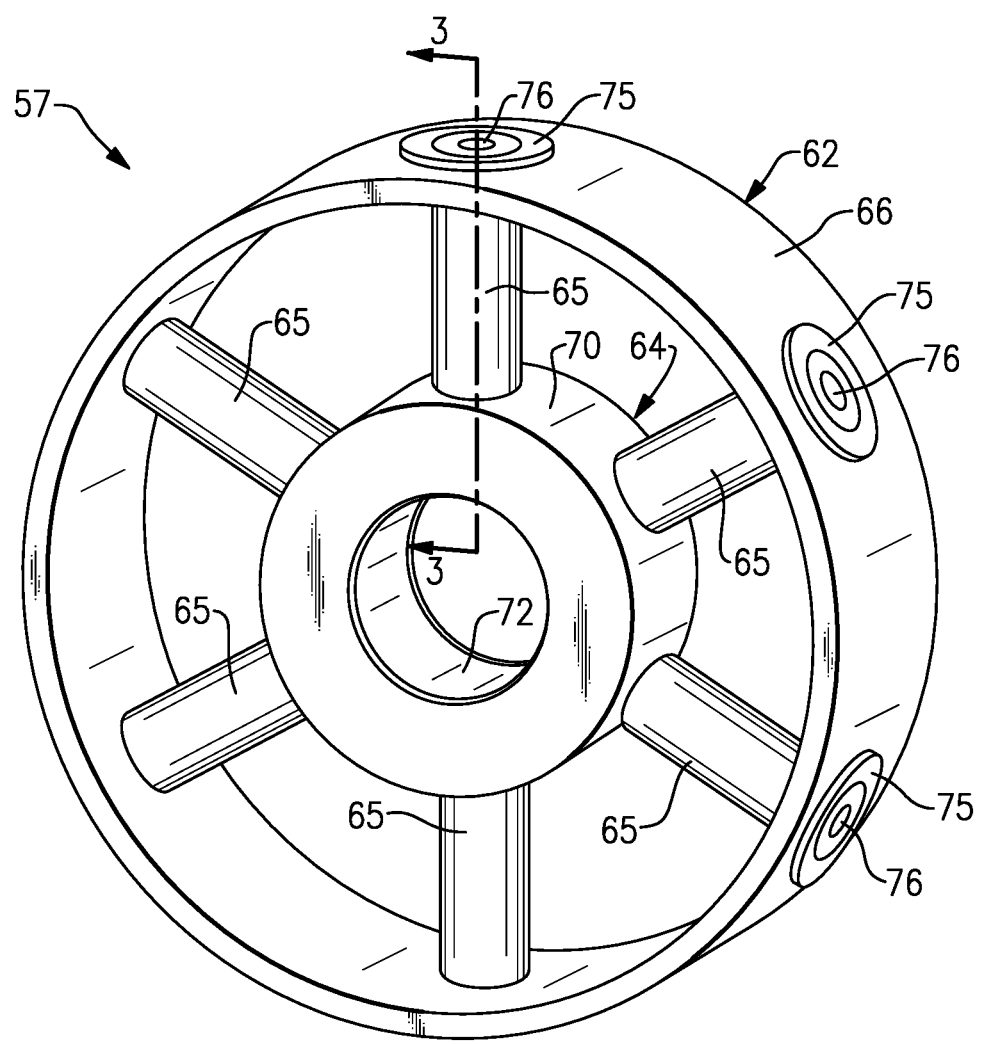
FIG. 2 is a schematic perspective view of an example mid-turbine frame in the gas turbine engine.

FIG. 2 is a schematic perspective view of one embodiment of mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed evenly around the circumference of the inner frame case 64 to provide structural support between the inner frame case 64 and the outer frame case 62. In the illustrated embodiment, each of the hollow spokes 65 is directly opposite (i.e. 180 degrees from) another of the hollow spokes 65. In alternative embodiments, the mid-turbine frame 57 can have an odd or even number of hollow spokes greater than or less than six.

The inner frame case 64 supports the rotor assembly via the bearing systems 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearing systems 38.

Figure 3:
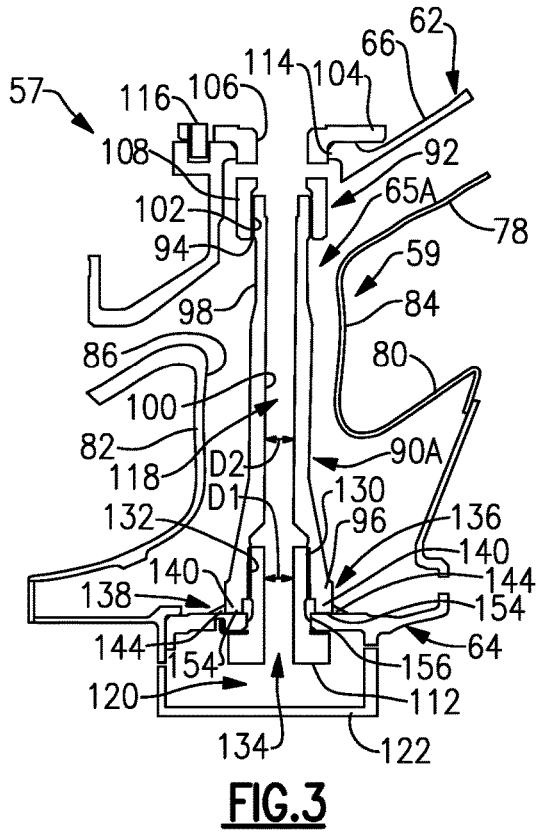
FIG. 3 is a cross-sectional view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a circumferential direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a bolt opening 156 in the inner frame case 64. The tie rod 90A is secured to the inner frame case 64 via a central bolt 112 that extends into an interior of the tie rod 90A. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the central bolt 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 extends radially inward to a bearing support cavity 120 to provide cooling airflow to the bearing support cavity 120. The bearing support cavity 120 is partially defined by a bearing support member 122 and the inner frame case 64.

The central bolt 112 includes a threaded exterior surface 130 at a distal end that engages a threaded interior surface 132 on the tie rod 90A. An airflow passage 134 extends axially through a center of the central bolt 112 and is aligned with the inlet passage 118. The airflow passage 134 includes a diameter D1 and the inlet passage 118 includes a diameter D2. In the illustrated example, the diameters D1 and D2 are within 10% of being equal. In another example, the diameter D1 is more than 10% smaller than the diameter D2 in order to restrict flow of the cooling airflow into the bearing support cavity 122.

Figure 4:
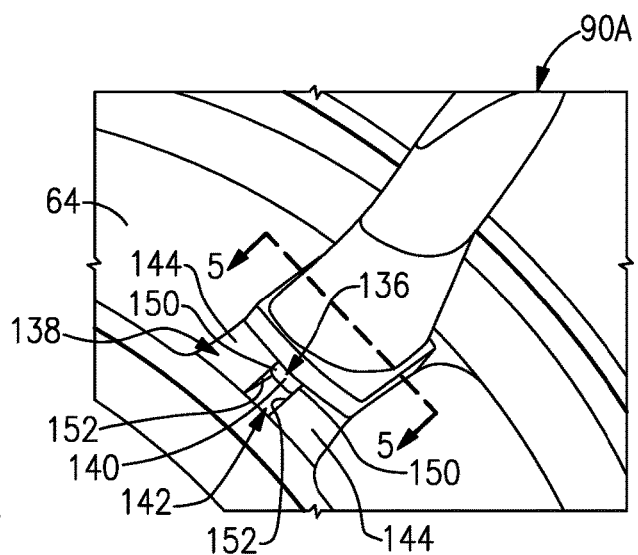
FIG. 4 is perspective view of an example tie rod and an example inner frame case.
Figure 5:
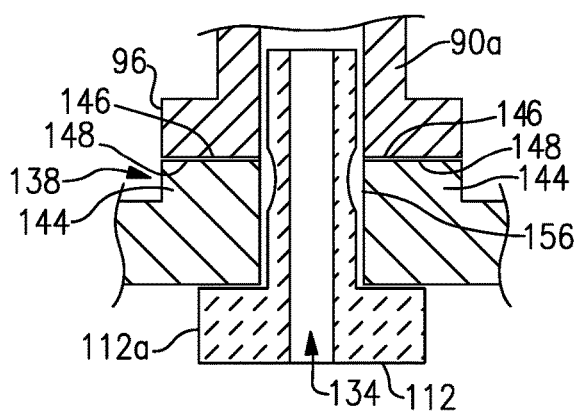
FIG. 5 is a sectional view taken along line 5-5 of FIG. 4.

As shown in FIGS. 3-5, the radially inner end of the tie rod 90A includes a first keyed feature 136 that engages a second keyed feature 138 on the inner frame case 64 to prevent the tie rod 90A from rotating relative to the inner frame case 64. In the illustrated example, the first keyed feature 136 includes at least two tabs 140 with at least one tab 140 located on an upstream side of the inlet passage 118 and at least one tab 140 located on a downstream side of the inlet passage 118. The at least two tabs 140 are accepted within a groove 142 defined by at least two protrusions 144 radially outward and axially extending.

In the illustrated example, a lower surface 146 of the flange 96 engages a radially outer surface 148 on the protrusions 144 and circumferential faces 150 on the at least two tabs 140 engage corresponding circumferential faces 152 on the protrusions 144. A radially inner surface 154 on the at least two tabs 140 is spaced from the inner frame case 64 to ensure that the lower surface 146 on the flange 96 properly engages the protrusions 144 without that at least two tabs 140 bottoming out on the inner frame case 64.

As shown in FIG. 5, the inner frame case 64 includes the bolt opening 156 for accepting the central bolt 112 to allow a head 112a of the central bolt 112 to directly contact a radially inner side of the inner frame case 64. The central bolt 112 extends through the bolt opening 156 and includes a cylindrical surface that is directly adjacent the inner frame case 64 and/or may directly contact the inner frame case 64. The tie rod 90A is spaced radially outward from the bolt opening 156 and does not extend through the bolt opening 156, such that the tie rod 90A is only located on a radially outer side of the inner frame 64.

Figure 6:
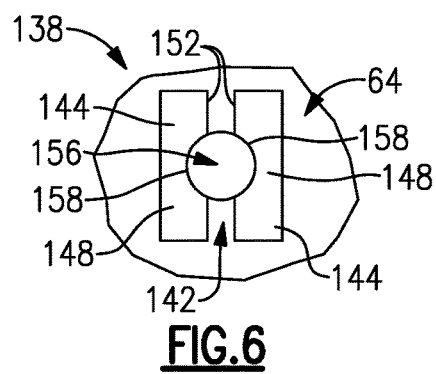
FIG. 6 is a view of the example inner frame case.

FIG. 6 illustrates the protrusions 144 located on a radially outer side of the inner frame case 64 on opposite sides of the bolt opening 156. The protrusions 144 include a curved recess 158 to accommodate the bolt opening 156 in the inner frame case 64.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of assembling a mid-turbine frame comprising:

engaging an outer frame case with a radially outer end of at least one spoke, wherein the at least one spoke includes an inlet passage extending radially through the spoke;

engaging a groove in an inner frame case with at least two tabs on a radially inner end of the at least one spoke; and securing the at least one spoke to the inner frame case with a central bolt extending through a bolt opening in the inner frame case and into the at least one spoke, wherein the central bolt includes an airflow passage extending radially through the central bolt aligned with the inlet passage.

2. The method of claim 1, wherein the groove is formed by at least two protrusions located on opposite sides of a bolt opening in the inner frame case.

3. The method of claim 2, wherein the central bolt includes external threads that engage internal threads on the at least one spoke.

4. The method of claim 3, wherein the internal threads on the at least one spoke are located radially outward from the inner frame case.

5. The method of claim 3, further comprising spacing the at least two tabs from the inner frame case to ensure that the at least two protrusions engage the radially inner end of the at least one spoke.

6. The method of claim 2, wherein the bolt opening extends through the groove.

7. The method of claim 6, wherein the at least two protrusions includes a first protrusion located on a first circumferential side of the bolt opening and a second protrusion located on a second circumferential side of the bolt opening.

8. The method of claim 7, wherein the first protrusion includes a first protrusion curved recess to accommodate the bolt opening and the second protrusion includes a second protrusion curved recess to accommodate the bolt opening.

9. The method of claim 1, further comprising engaging a radially inner surface of the inner frame case with a head on the central bolt.

10. The method of claim 1, wherein the groove is at least partially defined by a first protrusion located on a first circumferential side of the groove and a second protrusion located on a second circumferential side of the groove.

11. The method of claim 10, wherein the bolt opening is located circumferentially between the first protrusion and the second protrusion.

12. The method of claim 10, further comprising axially aligning the first protrusion and the second protrusion with the bolt opening.

13. The method of claim 12, wherein the first protrusion and the second protrusion extend from axially upstream of the bolt opening continuously to axially downstream of the bolt opening.

14. The method of claim 10, wherein the first protrusion and the second protrusion at least partially circumscribe the bolt opening.

15. The method of claim 10, wherein the first protrusion includes a first protrusion curved recess to accommodate the bolt opening and the second protrusion includes a second protrusion curved recess to accommodate the bolt opening.

16. The method of claim 15, wherein the at least two tabs includes a first tab axially upstream of a second tab.

17. The method of claim 16, further comprising engaging the first tab with first protrusion and the second protrusion located upstream of the first protrusion curved surface and the second protrusion curved surface and engaging the second tab with first protrusion and the second protrusion located downstream of the first protrusion curved surface and the second protrusion curved surface.

* * * * *